April 16, 1935.  L. F. BALLOU  1,997,848

INDICATOR FOR VEHICLE LIGHTS

Filed Nov. 11, 1932

Inventor
Laurence F. Ballou
By Attorneys
Southgate Hay & Hawley

Patented Apr. 16, 1935

1,997,848

UNITED STATES PATENT OFFICE 1,997,848

INDICATOR FOR VEHICLE LIGHTS

Laurence F. Ballou, Ludlow, Vt.

Application November 11, 1932, Serial No. 642,270

1 Claim. (Cl. 177—311)

This invention is capable of somewhat general application but relates more particularly to headlights or other signal lights on vehicles such as automobiles or power boats.

It is the common practice to operate these headlights or signal lights in pairs, and to place the lights in parallel circuits so that the failure of one light will not cause failure of the other light. It is very difficult, however, for a person behind the lights, such as the driver of an automobile, to detect the failure of one only of a pair of associated lights.

It is the general object of my present invention to provide an improved indicator by which failure of either one of a pair of lights operating in parallel circuits will be clearly and promptly shown. In a modified form of my invention, provision is made to indicate the failure of either one of two different lights in each of two parallel circuits.

My invention further relates to arrangements and combinations of parts which will be hereinafter described and more particularly pointed out in the appended claim.

A preferred form of my invention, together with a modification thereof, is shown in the drawing, in which Fig. 1 is a front elevation of my improved indicator;

Figure 6:
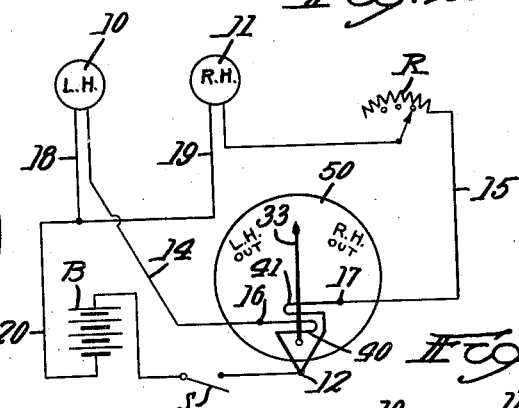
Fig. 6 is a diagrammatic view of the electric circuits for indicating a pair of headlights.

Referring to the drawing, I have shown in Fig. 6 a layout of electric circuits by which my improved indicator is adapted to show the condition of each one of a pair of headlights 10 and 11.

I have shown a source of current, such as a battery B, connected through a headlight switch S to one terminal or binding post 12 of my improved indicator. Branch circuits 14 and 15 extend from posts 16 and 17 in the indicator to the lights 10 and 11, and wires 18 and 19 and a common return wire 20 complete the circuit. An adjustable resistance or rheostat R may be included in one of the branch circuits for a purpose to be described.

My improved indicator comprises a recessed casing 30 (Fig. 4) on the back of which the binding posts 12, 16 and 17 are mounted. A bracket 32 is supported by the posts 16 and 17 but is insulated therefrom and also from the casing 30.

Figure 3:
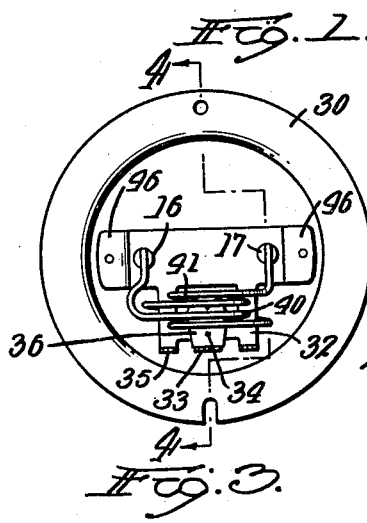
Fig. 3 is a sectional front elevation with the magnet plate removed.
Figures 4, 5:
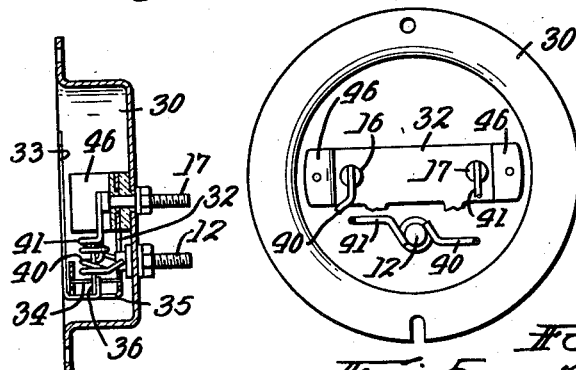
Fig. 4 is a sectional side elevation, taken along the line 4—4 in Fig. 3.
Fig. 5 is a front elevation showing certain wiring connections.

A pointer 33 is mounted on a pintle 34 supported in delicate pivot bearings in the U-shaped lower end portion 35 of the bracket 32. The pintle 34 also supports a plate 36 (Fig. 3) of soft iron or other magnetic material. This plate 36 extends upward above the pintle 34 into the magnetic field produced by reverse wire coils 40 and 41, interposed between the terminal or binding post 12 and the binding posts 16 and 17 respectively, as indicated in Figs. 4, 5 and 6.

A small U-shaped permanent magnet 44 (Fig. 3) is mounted in a sheet metal holder 45 and is supported by forwardly projecting ears 46 (Fig. 3) of the bracket 32. A disc or dial 50 is also supported on the ears 46, with the pointer 33 projecting freely through an opening 51 in the lower portion of the dial. The dial is provided with a scale having a normal index or zero line at the middle thereof and having insignia at the two ends of the scale indicating that the right-hand or the left-hand headlight is out. A glass 55 is secured over the dial and pointer by a cover ring plate 56.

Having described the details of construction of my improved indicator, the operation thereof is as follows:

When the switch S is open, there is no current flowing in either coil 40 or 41, but the permanent magnet 44 holds the pointer 33 in mid or zero position. When the switch is closed and both headlights are in operation, current flows through both coils 40 and 41 so that the substantially equal magnetic fields produced thereby are mutually neutralized, and the pointer remains in mid position. The rheostat R may be used to adjust any slight inequalities in current flow so that the pointer may be accurately centered at the zero position.

Figure 1:
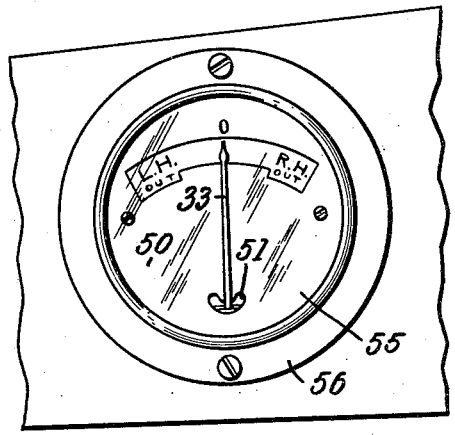
Figure 2:
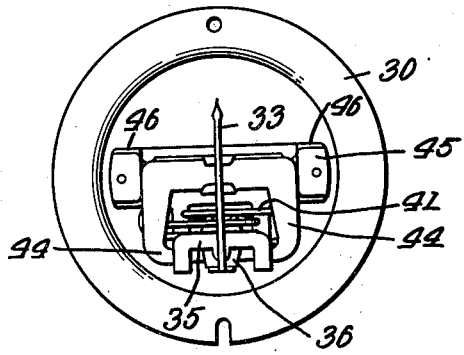
Fig. 2 is a similar view with the dial removed.

Assuming now that the left-hand headlight burns out, the circuit will be broken through the coil 40 and no further magnetic field will be produced thereby, while current will continue to flow through the coil 41. Consequently the pointer 33 will be swung to the left in Figs. 1 and 6 to indicate that the left-hand headlight is out. Failure of the right-hand headlight will be similarly indicated by a swing of the pointer 33 to the right.

I have thus provided a very simple indicating device having only a single moving part and by the movement of which part the failure of either one of two lights in parallel circuits will be immediately indicated and the particular light which has failed will be pointed out.

While I have shown my invention embodied in an indicating device in which the magnetic coils are fixed, I do not wish to be limited thereto, as fixed coils and movable coils are both common and are used interchangeably in indicating devices of many different kinds.

Figure 7:
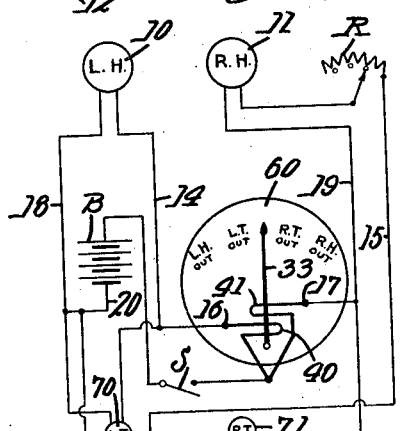
Fig. 7 is a view similar to Fig. 6 but showing a modified construction for indicating both headlights and tail lights.

In Fig. 7 I have shown an indicator constructed as previously described, except for additional insignia on the dial 60. The circuits are the same as previously described except for the insertion of tail lights 70 and 71 in parallel with the headlights 10 and 11 respectively. With this construction, the normal current flow through the coil 40 is the combined flow through the parallel circuits for the headlight 10 and tail light 70, while the normal flow through the coil 41 is the combined flow through the headlight 11 and tail light 71.

If now the left-hand tail light 70 fails, there will be a partial reduction in flow through the coil 40 and the pointer 33 will swing to an intermediate left-hand position indicating that the tail light is out. If on the other hand the left-hand headlight 10 fails, there will be a much greater reduction in flow through the coil 40 and the pointer 33 will swing further to the left to indicate that the headlight is out. Similar swings to the right indicate that the right-hand tail light or right-hand headlight are not operating.

It will thus appear that I have provided an exceedingly simple indicating device by which the condition of either one of a pair of head lights is promptly and visibly indicated or in the modified construction the condition is indicated for either one of two pairs of lights each comprising a headlight and a tail light.

Having thus described my invention and the advantages thereof, I do not wish to be limited to the details herein disclosed, otherwise than as set forth in the claim, but what I claim is:—

A lighting system comprising a source of current supply, an indicator having a movably mounted indicating member, two parallel branch circuits connecting said indicator to said source of current supply, each branch circuit containing an indicating coil, a headlight and a tail light, and said associated head and tail lights being of different current capacities and connected in parallel at each branch circuit, full current being maintained in each circuit when both of its lights are operating and said indicating member being thereby held in mid-position when all of the lights in both circuits are operating, and said indicating member being deflected in one direction or the other by reduction of current in one of said branch circuits on the failure of a light therein, said indicating member being deflected in different directions on failure of a light in one or the other of said parallel branch circuits and being deflected different amounts in a given direction on failure of a headlight or a tail light in a given branch circuit, whereby failure of a particular light is plainly indicated.

LAURENCE F. BALLOU.